Aug. 18, 1925.                                                              1,550,255
T. L. HILES
METHOD OF AND APPARATUS FOR MAINTAINING A VARIABLE SUPPLY OF GASEOUS
FLUIDS FOR COMBUSTION
Filed Dec. 13, 1920            2 Sheets-Sheet 1
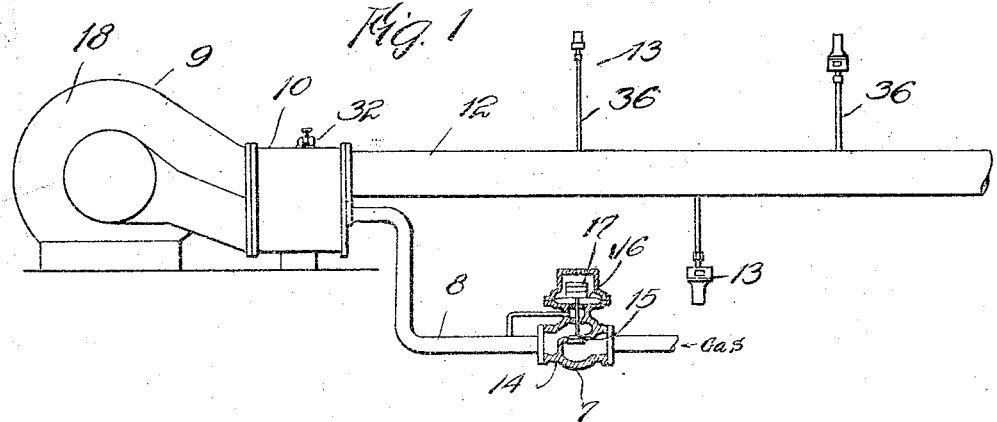
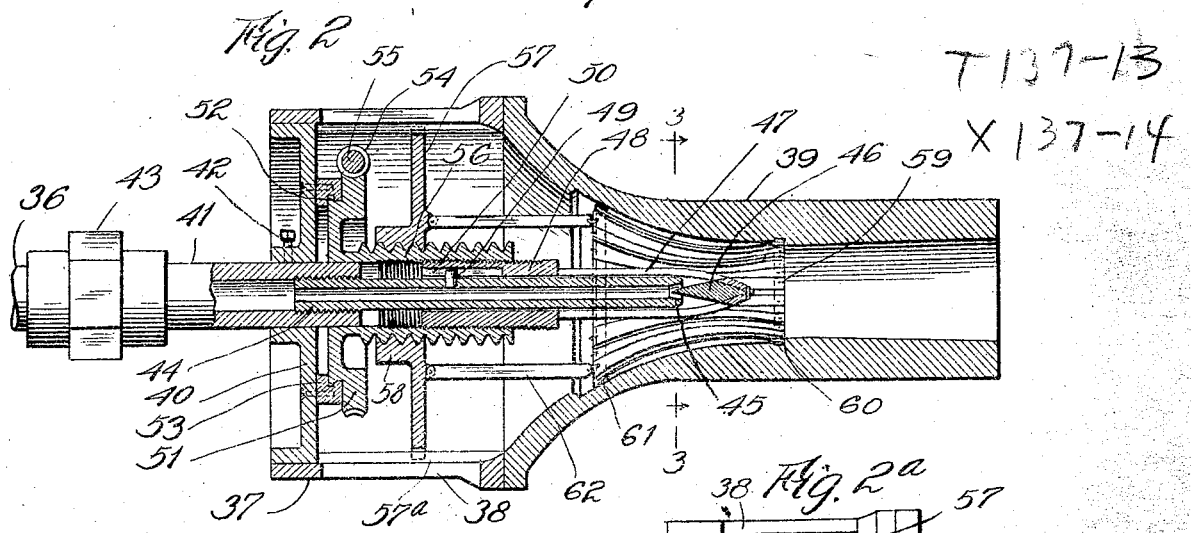
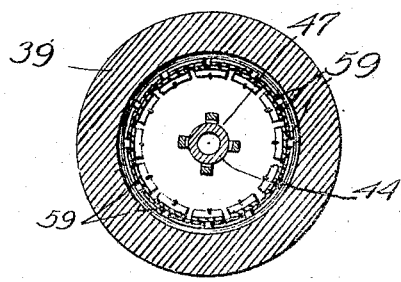
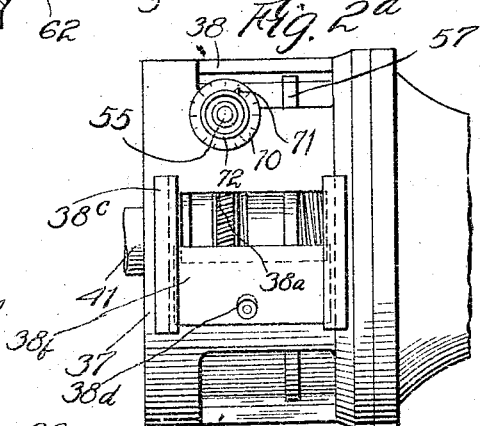
Inventor
Theron L. Hiles

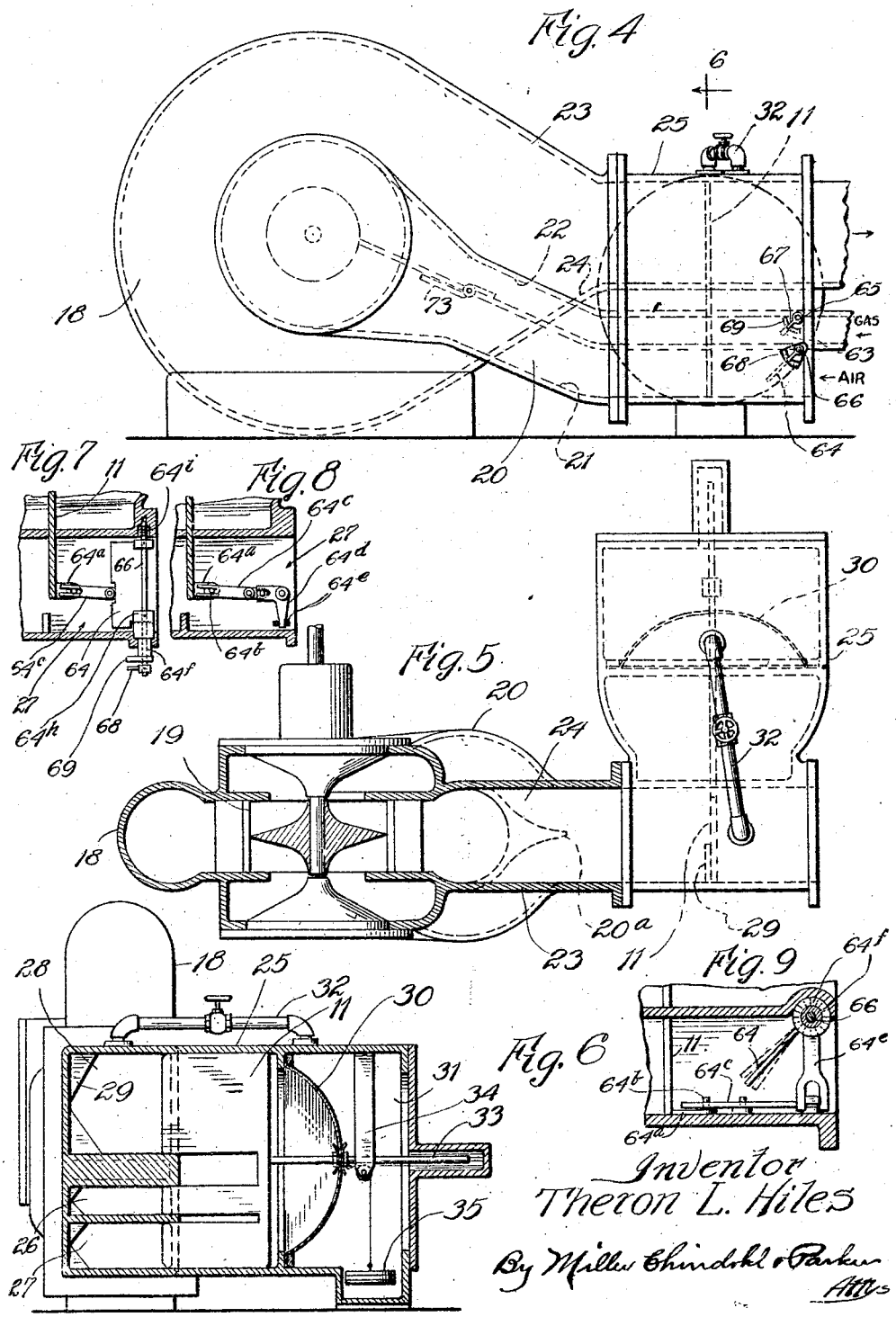

Patented Aug. 18, 1925.

1,550,255

UNITED STATES PATENT OFFICE.

THERON L. HILES, OF NILES, MICHIGAN.

METHOD OF AND APPARATUS FOR MAINTAINING A VARIABLE SUPPLY OF GASEOUS FLUIDS FOR COMBUSTION.

Application filed December 13, 1920. Serial No. 430,574.

*To all whom it may concern:*

Be it known that I, THERON L. HILES, a citizen of the United States, residing at Niles, in the county of Berrien and State of Michigan, have invented certain new and useful Improvements in Methods of and Apparatus for Maintaining a Variable Supply of Gaseous Fluids for Combustion, of which the following is a specification.

The invention has for its general aim the efficient and mobile control of gaseous fluids such as fuel gas, or a mixture of gas and air, which is supplied for heating purposes under widely varying conditions of use.

The use of gas fuel for industrial purposes has become, in recent years, increasingly extensive, and by reason of the widely varying demands upon a service main supplying the gaseous fuel, it has become extremely difficult, if not impossible with existing apparatus to maintain at the various places of combustion and under the varying conditions of use an efficient control of the fluids. In each instance of use, it is essential to efficient combustion that the proper ratio between the gases constituting the combustible mixture be maintained. What the proper ratio in a given case may be depends upon the conditions of use,—for instance, whether the combustion takes place in the open air or in a closed chamber, and also upon the purpose for which the heat resulting from the combustion is to be used, the mixture in some cases requiring a greater element of carbon than in others, and in other instances requiring a greater amount of oxygen.

The object of the present invention is to provide an improved method and apparatus enabling the easy and accurate maintenance, at the various outlets along the service line, of a supply of combustible mixture properly constituted to effectively satisfy the peculiar requirements of the various users, with a resulting increased efficiency in industrial gas combustion.

In carrying out my invention I provide a gas supply system embodying means for stabilizing the pressure of a fuel gas as it comes from its source of supply, and means such as a compressor for intimately mixing a quantity of air with the gas to form a primary mixture. The desired ratio between the air and gas thus intermixed is obtained by adjustment, the proportions being such as to render the mixture not readily combustible. The volume of the primary mixture required for consumption continually fluctuates because of the varying demand therefor, and to compensate for such fluctuation, the compressor is provided with suitable valve means controlled by the variations in pressure in the service main so as to coordinate the volume of air and gas admitted to the compressor with the volume which is being consumed at any given time. Heretofore it has been customary in apparatus of this general character to return a portion of the mixture, over and above that required for consumption, from the outlet of the compressor to the inlet thereof, resulting not only in a waste of power, but in the disturbance of the ratio between the air and gas constituting the mixture, such disturbance of the ratio being due to the variation in suction intensity at the inlet of the compressor resulting from the return flow of a portion of the mixture. By the valve means referred to, the necessity for a return flow of excess mixture is obviated so that the disturbance of the ratio experienced in prior apparatus is avoided. Also the pulsations or surgings commonly experienced in apparatus of this character, and especially those employing rotary compressors of the non-positive type, are substantially eliminated, with the result that the flow of the mixture through the system is further stabilized.

Associated with the valve means for controlling the flow of the primary mixture through the compressor is an adjustable mechanism for maintaining in the service main a predetermined pressure. Finally at the various points of distribution of the primary mixture, a secondary supply of air is added to the mixture through the medium of adjustable devices or unloaders. These devices embody means manually operable to vary at will the volume of the primary mixture discharged for consumption, and means operatively associated with said manually operable means for automatically controlling the volume of the secondary supply of air for mixture with the primary mixture. To compensate for the tendency of the air, because of its greater specific gravity, to respond less readily to an increased suction thereon, I provide means at the air inlet opening of the compressor and also at the unloaders for additionally regulating the air supply properly to control it in order to maintain the desired ratio between the air and gas for efficient combustion.

It is thus insured that the ultimate or final mixture passing from the unloader shall be of the proper content of carbon and oxygen for the particular use to which it is to be applied. Furthermore, the unloading devices comprise means for automatically varying the cross-sectional area of the outlet passages, which are in the form of Venturi tubes, whereby to maintain the flow of the mixture through the passage sufficiently rapid to prevent backfiring.

In the accompanying drawings, I have illustrated one embodiment of my invention, but it is to be understood that the invention is not limited to the particular form and construction of apparatus herein illustrated and particularly described, and that in the interpretation of the appended claims they are not to be limited except as may be necessitated by the state of the prior art.

Figure 1 of the drawings is a view partially diagrammatic in character illustrating a gas supply system for carrying out my invention. Fig. 2 is a fragmentary sectional view of one of the unloading devices. Fig. 2ª is a fragmentary view showing a detail of construction. Fig. 3 is a transverse sectional view taken on the line 3—3 of Fig. 2. Fig. 4 is a side elevation of a compressor and the means for controlling the flow of the mixture therethrough. Fig. 5 is a horizontal sectional view through the compressor, the controlling means therefor being shown in top plan view. Fig. 6 is a transverse sectional view through the controlling means taken substantially in the plane of line 6 of Fig. 4. Fig. 7 is a fragmentary horizontal section illustrating a means for automatically actuating the air inlet valve. Fig. 8 is a similar view taken in a plane below said valve. Fig. 9 is a fragmentary vertical section showing said means in end elevation.

Referring now to Fig. 1, the system comprises generally a reducing valve 7 interposed in a pipe line 8 communicating with a a suitable source of fuel gas supply. 9 designates generally the compressor, and 10 the controlling means therefor embodying valve-controlled inlet passages for gas and air, and an outlet passage for the mixture, the pipe line 8 being connected to discharge into the gas inlet passage. 11 (Fig. 4) indicates a valve member constituting part of the mechanism for controlling the flow of the mixture through the compressor. This valve member 11 is mounted so that it is automatically controlled by the pressure in the outlet passage to coordinate with the volume of the mixture issuing from the compressor the combined volume of air and gas admitted to the compressor. 12 is a pipe line constituting the service main leading from the outlet of the compressor and having communicating therewith various branch or supply pipes provided with unloading devices 13.

The reducing valve 7 may be of any preferred or well known construction. That shown herein comprises a casing 14 having a valve-controlled passage 15 therethrough. The valve in turn is controlled by a diaphragm 16 which is subjected to the pressure of the gas at the outlet side of the valve. This device is adjustable through the medium of weights 17 so as to maintain in the pipe line 8 at the inlet of the compressor a predetermined degree of pressure of the gas. This pressure may, for example, be 1″ water column.

The compressor 9 herein shown is of the type comprising an annular casing 18 having rotatively mounted therein an impeller 19. This impeller is of the non-positive type but a blower of the positive type may be, and preferably is employed. In the non-positive type illustrated, even though the inlet and outlet openings be completely closed, the compressor may continue to operate since slippage is possible between the impeller and the casing in the operation of the compressor. The inlet and outlet for the casing of the compressor are herein arranged so as to be juxtapositioned and hence capable of being controlled by a single valve member. To this end the casing is shaped on opposite sides (Fig. 5) to provide suitable ways or channels 20 communicating with the casing at the axis of the impeller and each divided to form an air passage 21 and a passage 22 for fuel gas. Between said channels the casing has a laterally extending portion 23 providing an outlet passage 24 terminating above the passage 22. The opposite channels 20 are brought together at their outer ends so that the pairs of passages 21 and 22 merge into single passages as at 20ª (Fig. 5).

The controlling means 10 for said inlet and outlet passages of the compressor comprises a casing 25 (Fig. 6) which is divided by horizontal partitions to form a gas inlet chamber 26, an air inlet chamber 27 and an outlet chamber 28 for the primary mixture. The valve member 11 is mounted in the casing 25 so as to slide with reference to the partitions forming the chambers, being slotted as shown in Fig. 6 for this purpose. It thus controls simultaneously the passageways through the chambers 26, 27 and 28. Preferably the inner wall of the casing is provided with V-shaped web portions 29 with which the end of the valve member 11 is adapted to coact to gradually open or close said passageways.

The valve member 11 is arranged to be automatically actuated in the operation of the compressor by means of a diaphragm 30 mounted in the casing 25 so as to form in one end thereof a closed chamber 31 which communicates by way of a valve-controlled pipe line 32 with the mixture outlet chamber 28. A rod 33 rigid with the valve member 11 is fixed to the diaphragm 30 and has a bearing in a depending bracket 34 so as to be horizontally slidable in the movements of the diaphragm under the influence of pressure communicated to the diaphragm chamber 31 from the chamber 28. Said diaphragm has connected therewith a variable weight 35 which serves to maintain a predetermined pressure at the outlet of the chamber 28 by its action upon the valve member 11.

Leading from the chamber 28 is the service main 12 having branch pipes 36 which serve to distribute the primary mixture to the unloading devices 13. Said devices are made of varying sizes depending upon the nature of the use to which the gas is to be put, and each comprises an annular casing 37 having inlet openings 38 and 38$^a$ for the admission of the secondary supply of air, and a discharge tube 39. The rear wall of the casing 37 is closed by a plate 40 apertured to receive a pipe 41 to which the plate is secured as by means of a set screw 42. The pipe 41 is connected at its rear end with a branch pipe 36 as by means of a coupling 43, and has secured in its forward end a nozzle 44 of substantial length apertured as at 45 to provide a discharge orifice for the primary mixture. The pipe 44 is preferably screw-threaded into the pipe 41 so as to be adjustable relative thereto.

The means for controlling the discharge of the primary mixture from the nozzle 44 comprises a conical valve member 46 adapted to engage with a similarly shaped seat provided by the orifice 45 and mounted in position for movement toward and away from its seat. The shape of the orifice, together with the conical valve member 46, tends to spread or diffuse the primary mixture in the path of the incoming secondary air supply, thus insuring an intimate mixture of the gases. The movement of the valve is effected by means of a plurality of arms 47 secured at their rear end upon a sleeve 48 slidably but non-rotatably mounted upon the exterior of the nozzle 44. Herein a pin 49 in the nozzle 44 engages in a groove 50 in the sleeve to hold the sleeve against rotation. It will be seen that the movement of the valve member 46 toward and away from the discharge end of the nozzle 44 will vary the volume of the primary mixture discharged into the unloader tube 39, and in its passage into such tube the mixture with an injector-like action, draws the secondary supply of air through the inlets 38 and 38$^a$ into the interior of the tube 39.

In prior apparatus of this character it has been common to employ in the burner discharge tube a valve member located within the tube a substantial distance from the outer end. When this valve is set in less than full open position, it presents an obstruction to the flow of the gas, with a resultant fall in pressure of the mixture after passing the valve but before reaching the point of discharge. This necessitates a higher pressure in the service main, if the velocity is to be maintained when the valve is partially closed, than when the valve is in wide-open position, and a waste in power at the compressor results. By locating the valve member exteriorly of the discharge tube, I am able to maintain the pressure substantially constant right up to the point of discharge of the mixture, and thus to insure the flow of the gas into the Venturi passage at the proper velocity.

The means for operating manually the valve 46 comprises a worm wheel 51 having a sliding connection with the rear end plate 40 of the unloader casing and rotatively mounted upon the inner or forward end of the pipe 41. Such connection herein comprises an annular flange 52 formed on the rear face of the worm wheel 51 and engaging in grooved members 53 secured upon the inner or forward face of the rear end plate 40. A worm 54 mounted on a shaft 55 extending transversely through the casing 37 operatively engage the sleeve 48 which carries the arms 47. The parts are so arranged that in the operation of the worm 54, the wheel 51 and sleeve 56 are actuated to move the valve member 46 into and out of operative association with its seat in the orifice 45, the screw-threads which provide the connection between the sleeves 48 and 56 being left-handed.

For the purpose of automatically controlling the flow of the secondary supply of air into the casing for intermixture with the primary mixture, and thus to insure that the proper ratio shall be maintained between the elements constituting the mixture, I provide a valve member 57 in the form of a disk adapted to coact with the openings 38 and 38$^a$ in the casing to vary the area thereof forwardly of the disk. The disk is notched at its periphery so as to slidably engage inturned ribs 57$^a$ and is thus held against rotation. Centrally of the disk is a hub 58 having a screw-threaded connection, with right-hand threads, with the sleeve 56. The screw-threads constituting this connection are made of a size relatively larger or coarser than the threads forming the connection between said sleeve 56 and the inner sleeve 48, so that the movement of the valve member 57 is relatively greater than that of the valve member 46. The proper ratio between the movement of said valve members is, of course, dependent upon the nature of the final mixture desired and is readily determinable by those skilled in the art.

The automatic control of the air inlet openings 38 and 38ᵃ of the unloader casing 37 is sufficient for most purposes. When, however, the volume of the mixture consumed rises to or near the maximum of which the apparatus is capable, the primary mixture, discharged from the nozzle 45 at high velocity, induces in the rear end of the tube 39 a suction of substantial intensity. To regulate the flow of the secondary supply of air into the tube 39, I provide a manually operable peripheral slide member 38ᵇ which is guided at its opposite ends in guideways 38ᶜ and is provided with a suitable handle 38ᵈ by means of which it may be readily manipulated. In the operation of the unloader for the supply of a relatively large volume of mixture, the operator moves the valve member 38ᵇ, so as to enlarge the opening 38ᵃ to compensate for the tendency of the air to flow at a disproportionately slower rate than the gas as the volume of the mixture consumed increases. Furthermore, by this means, the relative carbon and oxygen content of the mixture may be readily varied at will to secure an oxidizing, reducing or neutral furnace atmosphere. This is of major importance since it enables the proficient adjustment of the apparatus to adapt it for the many and varied purposes for which the gas is used industrially.

The discharge tube 39 of the unloader is so arranged with reference to the discharge nozzle 44 that the latter terminates within the mouth of said tube. As is usual, the passageway provided by said tube 39 is peculiarly shaped so as to impart a high velocity to the mixture passing therethrough, the interior shape of the tube being such as to form what is known as the Venturi tube. The purpose of the Venturi tube is, as is well known, to maintain the velocity of the mixture sufficiently high as compared with the rate of flame propagation to insure that the combustion of the mixture shall take place without the tube in the furnace chamber instead of within the tube. It has been impossible, however, with prior apparatuses to obtain this result when the volume of the mixture discharged is varied to any substantial degree. Thus when the volume discharged is decreased substantially the rate of expansion is such that the energy of compression stored up in the gas becomes dissipated as it is discharged into a tube which is proportioned to handle efficiently the maximum nozzle discharge. I overcome this difficulty by varying the relative cross-sectional area of the discharge passage in accordance with the variation of the volume discharged thereinto and by thus limiting the expansion of the gas maintain the velocity of the mixture discharged sufficient to insure that under all conditions of use combustion will take place at the end of the discharge tube with the flame in contact therewith. Herein the means for varying the cross-sectional area of the discharge passage comprises a flexible inner sleeve or tube composed of a plurality of overlapping members or staves 59 of spring steel or the like connected at one end (herein the forward end) with a ring member 60 fixed within the tube 39 substantially centrally thereof, and at its opposite or rear end with a ring member 61 having sliding engagement with the inner surface of the tube 39 at the mouth thereof. Said staves 59 are preferably flexibly connected at their opposite ends with said ring members, and one of the ring members is connected with a movable part so as to flex the staves radially inwardly and outwardly and thereby vary the cross-sectional area of the passageway. Herein the ring members 61 are connected by means of rods 62 with the valve members 57 so that in the movements of the valve member the desired flexation of the staves is accomplished. The parts are so proportioned and arranged that as the volume of the gases passing through the tube 39 decreases, the cross-sectional area of the passage also decreases so that the velocity of the gas is maintained sufficiently high to prevent the retreat of the flame into the passage because of a higher rate of flame propagation and thus to insure that the combustion shall take place externally of the passage which is necessary for the efficient operation of the burner.

In the operation of the system, the supply of gas fuel is maintained at a predetermined pressure by the reducing valve 7 and together with a predetermined quantity of air is admitted to the inlet passages 26 and 27 of the controller casing 25. For the purpose of regulating the ratio between the volume of air and gas thus admitted, said inlet chambers are provided at the inlet or outer ends thereof with manually adjustable valve members. Herein said valve members are in the form of pivoted blades 63 and 64 fixed upon rods 65 and 66, respectively, and having operating handles 67 and 68. Indicator scales 69 are preferably provided upon the exterior of the casing with which the valve handles coact to indicate the position of the valve members 63 and 64. By this means the ratio between the gases admitted to the compressor may be readily varied at will.

In order also to maintain the proper ratio between the air and gas passing into the compressor as the volume consumed increases, I preferably provide automatic means shown particularly in Figs. 7 to 9 for disproportionately increasing the size of the air inlet aperture as the demand upon the system increases. This means may be of any suitable or preferred character. Herein it comprises an operative connection between the main controlling valve 11 and the air inlet valve 64. The valve 11 is provided near its lower edge within the chamber 27 with an outwardly extending arm 64$^a$ carrying a pivot pin 64$^b$ which is engaged by the forked end of a lever 64$^c$ pivoted on the bottom of the chamber 27. The outer end of said lever operatively engages with one end of a bell crank lever 64$^d$, also pivoted upon the bottom of said chamber, and the opposite end of said bell crank is connected with the lower end of a vertically disposed arm 64$^e$ (Fig. 9) fixed at its upper end upon a sleeve 64$^f$ rotatable on the valve rod 66. The sleeve 64$^f$ has clutch teeth adapted to engage with complementary teeth on a collar 64$^h$ rigid with the rod 66 and forced into engagement with said sleeve by means of a coiled expansion spring 64$^i$ acting between the inner wall of the chamber 27 and the valve member. It will be seen that by this construction, as the main valve 11 is moved by the diaphragm 30 to open the passageway through the chamber 27, it acts through the levers 64$^c$ and 64$^d$, the arm 64$^e$ and the interengaging sleeve and collar, to oscillate the valve rod 66 in a direction to enlarge the passageway through the chamber. The indicator scale 69 for the air valve 64 is carried by a segmental member rigid with the sleeve 64$^f$, and the indicator handle 68 is movable with reference to said member 69, as permitted by the slipping of the clutch teeth, for the purpose of enabling the manual adjustment of the valve 64, the sleeve 64$^f$ being held against movement by reason of its connection with the main valve 11. The valve 64 is thus capable of adjustment manually by the hand lever 68, and is actuated automatically in the movement of the main valve member 11 to open or close the opening through the chamber 27, the parts being so proportioned as to effect the extent of movement necessary to the efficient maintenance of the proper ratio between the air and gas under varying loads. This extent of movement is determined in practice by analysis and testing, as will be readily understood by those skilled in the art, that shown in Fig. 9 (dotted lines) being for purposes of illustration only.

The compressor having been set in operation, air and gas is drawn through the chambers 26 and 27 into the compressor casing where they are intimately mixed and then discharged into the outlet chamber 28, the passageways through said chambers being initially substantially unrestricted by the valve member 11. In the continued operation of the compressor, pressure building up in the service main 12 is communicated to the diaphragm 30, and when it has exceeded the predetermined pressure maintained by the weight 35, the valve member 11 is moved to restrict the flow of air and gas into and from the compressor. The parts are so arranged that the valve member acts to substantially close the passageways through the chambers 26, 27 and 28 when the pressure in the service main rises to any substantial degree above the predetermined pressure, and when the pressure in the service main falls below such predetermined degree, the valve member promptly responds to open the said passageway through said chambers. Should the pressure in the service main continue to rise above said predetermined degree, the member 11 acts to completely close the passageways through said chambers, cutting off the flow of air and gas to the compressor as well as the flow of the primary mixture from the compressor. This feature is of maximum importance by reason of the fact that it eliminates the necessity of returning to the compressor inlet the mixture over and above that required for consumption, as is common in prior apparatus.

When the pressure rises in the service main as by reason of the decrease in consumption of the primary mixture, the pressure has a tendency to build up until suddenly it seeks to find relief in a backward rush into the compressor. This is especially true when the compressor, as in the present instance, is of the non-positive type. It will be observed, however, that the valve 11 which is in or near its closed position when the pressure in the service main is high serves to effectively prevent such backward rush of the mixture and hence the pressure in the service main is stabilized. Similarly the rise and fall of the pressure within the compressor casing is prevented by the valve 11 from being communicated unrestrictedly to the inlet chambers 26 and 27, with the result that the pressure in the pipe line 8 is stabilized. Such stabilization of the pressure is of substantial importance in view of the fact that differences in pressure variously affect the flow of air and gas on account of their different specific gravities. The ultimate result attained therefore by thus stabilizing the pressure in the system is that the ratio between the air and gas constituting the mixture is capable of being maintained with substantial accuracy and hence a high efficiency in combustion is obtained.

By reason of the provision of the V-shaped web portions 29 in the chambers 26, 27 and 28, with which the valve member 11 coacts the action of the valve in restricting the flow of air and gas through the compressor is gradual so as to further prevent a surging of the mixture.

The unloader devices 13 are capable of easy adjustment for the purpose of regulating the degree or intensity of heat to be produced through the operation of the shaft 55, worm 54 and worm wheel 51, the rotation of the latter serving through the medium of the sleeves 56 and 48 to adjust the valve member 46 with reference to its seat in the outlet of the nozzle 44. The primary mixture discharges from the nozzle 44 into the tube 39 at a substantially constant velocity irrespective of the volume discharged, and with an injector-like action induces a secondary supply of air to flow into the tube through the openings 38 and 38ª thus to produce the final or combustible mixture. The volume of such secondary air supply is automatically controlled by the valve 57 operable simultaneously with the valve 46 and in the proper ratio to produce a mixture of the desired content for most purposes. When, however, the volume of the mixture consumed rises to or near the maximum, the increased suction upon the secondary air supply ports, acting with a disproportionately decreased effect upon the air, renders it necessary to enlarge said ports in order to maintain the proper ratio of air and gas in the ultimate mixture. This is accomplished by the manual adjustment of the peripheral slide valve of the unloader to decrease the effective size of the opening 38ª. Moreover, the cross-sectional area of the discharge tube is automatically varied in the adjustment of the valve means to maintain the velocity of the mixture notwithstanding a substantial decrease in the volume which is discharged for consumption, thus insuring that combustion shall take place without the discharge nozzle as intended.

For the purpose of facilitating the adjustment of the unloading devices to obtain heat of varying intensity, I preferably provide upon the casing 37 adjacent the shaft 55, a scale 70 (Fig. 2ª) with which a pointer 71 is adapted to coact. Said pointer may be formed upon a hand wheel 72 fixed upon the shaft 55. By this means, the control of the furnace or other heat consuming means may be accomplished by a workman possessing little or no skill in the art, it being only necessary that he be given the necessary instructions as to the setting of the indicating means for the proper period or periods of time. The construction also enables the workman to make finely graduated and delicate adjustments to control the volume discharged easily and with the utmost precision. This is due to the micrometric character of the connections provided by the screw threads of varying sizes between the rotary member 56 on the one hand and the air and gas valves on the other.

It will be seen that I have produced a system of control for a combustible gaseous mixture such that the peculiar requirements of a great variety of users are effectively supplied. By the construction provided for the unloaders, the gas may be supplied for combustion in varying volumes with a high degree of efficiency. Thus the velocity of the primary mixture discharged is maintained substantially constant notwithstanding variations in the volume, by the arrangement of the valve externally of the discharge nozzle, and further by adjusting the Venturi passage. Moreover, a saving in the power factor at the compressor is effected through the automatic control of the gas as it is discharged, which, as above set forth, renders it possible to operate with a lower base pressure in the service line with a consequent reduction in the loss due to friction and in the power consumed by the compressor.

The manually adjustable and automatically operating valve means are capable of adjustment so as to maintain under all conditions the proper ratio between the air and gas content of the ultimate mixture. Upon the exactness and facility of the adjustments depends the definite control of temperatures, gas economy, etc. The work to be heat-treated may be of a delicate nature, as for example, the making of electric light bulbs where needle point flames are required, the combustion taking place in the open air, or in the heat treatment of steel or other metal involving the combustion in closed chambers of thousands of cubic feet of gas hourly. In any case, the system which I have provided is capable of accurate adjustment to effect a high degree of efficiency in gas combustion. Consequently the combustion of the mixture is capable of accomplishment in each particular instance of use with the highest degree of efficiency.

For the purpose of preventing the escape of fuel gas from the compressor when the latter is idle, I provide an automatically operable valve means shown in broken lines in Fig. 4. This valve device is in the form of a simple butterfly valve 73 with the opposite wings thereof offset slightly with reference to each other and with its axis within the partition separating the air and gas inlet passageways 21 and 22. The passageway 22 being of smaller cross-sectional area than the passageway 21, the portion of the valve member closing it is smaller than the portion closing the other passage. In the operation of the compressor, the portion of the valve member having the greatest area is drawn forwardly forcing the opposite wing portion rearwardly and thus opening both passageways. Upon the cessation of operation of the compressor, gravity acting upon the larger wing member causes the device to assume an upright position such that it will cut off communication between the compressor and the respective passageways and thus prevent the flow of gas to the compressor and thence to the atmosphere by way of the passageway 21.

It will be obvious that it may in some instances be desirable to accomplish a complete primary mixture of the air and gas at the unloader device. Thus where water gas is used so that the proportion of air to be mixed therewith is relatively small, the mixture must take place in the unloader. In this event, therefore, only the gas would be compressed.

I claim as my invention:

1. In a gaseous fuel supply system an unloader comprising a casing, a discharge tube communicating at one end with the casing and providing a Venturi passage, said casing providing an air inlet, a nozzle arranged to discharge a primary mixture of air and gas into the Venturi passage, valve means for controlling the discharge of the mixture from said nozzle, and means other than said valve means and operatively associated therewith adapted to vary the size of said Venturi passage as the volume of the primary mixture discharged varies.

2. In a gaseous fuel supply system, an unloader comprising a casing, a discharge tube communicating at one end with the casing and providing a Venturi passage, said casing providing an air inlet, a nozzle arranged to discharge a primary mixture of air and gas into the Venturi passage in the low pressure region thereof, valve means for controlling the discharge of the mixture from said nozzle, means associated with said valve means for controlling the secondary air supply, and means other than said valve means and operatively associated therewith adapted to vary the size of said Venturi passage as the volume of the primary mixture discharged varies.

3. In a gaseous fuel supply system the combination of means providing a Venturi passage, a nozzle arranged to discharge a primary mixture of air and gas near the inner end of the throat of the passage, a valve for controlling the discharge of the primary mixture from said nozzle, means associated with said valve for controlling a secondary air supply to said passage, and means for varying the capacity of the Venturi passage as the volume of the primary mixture and the secondary air supply increases or decreases.

4. In a gaseous fuel supply system the combination of means providing a Venturi passage, a nozzle arranged to discharge a primary mixture of air and gas adjacent the inner end of the throat of the passage, a valve for controlling the discharge of the primary mixture from said nozzle, means associated with said valve for controlling a secondary air supply to said passage, and means for varying the capacity of the Venturi passage as the volume of the primary mixture and the secondary air supply increases or decreases, the last mentioned means comprising a flexible sleeve operable to vary the contour of the passage.

5. In a gaseous fuel supply system, an unloader comprising means providing a Venturi passage having a flexible lining or sleeve, means for discharging a primary mixture of air and gas into said passage, valve means for controlling such discharge, and means operatively connecting said valve means with said flexible sleeve whereby to cause the latter to vary the capacity of the said Venturi passage as the volume of the primary mixture discharged varies.

6. The combination of a discharge tube providing a Venturi passageway, and means including a flexible wall in the passage operable to vary the volumetric capacity of the passage at will.

7. An unloader for gaseous fuel supply systems comprising, in combination, a flexible discharge tube, a nozzle arranged to discharge into said tube, a valve for controlling said nozzle, a valve for controlling the supply of air to said tube, and micrometric means for operating said valves and simultaneously flexing said tube to vary the volumetric capacity of the passageway formed thereby.

8. An unloader for gaseous fuel supply systems comprising, in combination, a flexible discharge tube, a nozzle arranged to discharge into said tube, a valve for controlling said nozzle, a valve for controlling the supply of air to said tube, means connecting the air valve with said tube to flex it whereby to vary its volumetric capacity and micrometric means for imparting disproportionate movements to said valves simultaneously.

9. An unloader for gaseous fuel supply systems comprising a discharge tube, a nozzle arranged to discharge into said tube, a valve for controlling said nozzle, means providing an air inlet opening, a valve for controlling said opening, micrometric means for operating said valves, and means providing a Venturi passage in said tube into which said nozzle discharges, said means being operatively connected with one of said valves and adapted in the movement thereof to vary the capacity of the Venturi passage formed thereby.

10. In a gaseous fuel supply system, an unloader comprising a discharge tube shaped to provide a Venturi passage, a nozzle arranged to discharge into said passage substantially in the region of lowest pressure, means for supplying gas under substantially constant pressure to said nozzle, a valve for controlling the discharge from said nozzle into the Venturi passage, and means operable in the movements of said valve to increase or decrease the size of said Venturi passage as the volume discharged from said nozzle increases or decreases.

11. In a gaseous fuel supply system the combination of a service main, means for supplying a gaseous fuel to said main adapted to maintain the fuel in the main at a substantially constant pressure, valve means for controlling the discharge of fuel from the main, and means for maintaining a predetermined velocity of the fuel when discharged in varying volumes.

12. In a gaseous fuel supply system, a pipe line, means for supplying a gaseous fuel to said pipe line adapted to maintain it under a substantially constant pressure in the pipe line, means for controlling the discharge of the fuel for combustion, mechanism adapted to maintain a predetermined velocity of the fuel discharged notwithstanding fluctuations in the volume, and a device associated with said mechanism for controlling the admixture of a secondary gaseous element in a predetermined proportion.

13. In a gaseous fuel supply system, a pipe line, means for supplying a gaseous fuel to said pipe line adapted to maintain it under a substantially constant pressure in the pipe line, valve means for controlling the discharge of the fuel for combustion, mechanism connected with said valve means adapted to maintain a predetermined velocity of the fuel discharged notwithstanding fluctuations in the volume, and a device associated with said mechanism for controlling the admixture of a secondary gaseous element in a predetermined proportion.

14. A gaseous fuel supply system having an unloader adapted to effect the discharge of gaseous fuel in varying volumes but at a substantially constant velocity and comprising a discharge tube with a flexible wall operable to vary the volumetric capacity of the tube in accordance with the volume of fuel discharged at any given time.

15. A gaseous fuel supply system having an unloader constructed to effect the discharge of a variable volume of gaseous fuel under pressure while maintaining the velocity substantially constant and including means for controlling the admixture of a secondary gaseous element with said fuel in a predetermined ratio varying disproportionately as the volume of the primary fuel increases or decreases.

16. In an apparatus of the character described, the combination with a service main, and means for supplying to the service main a primary mixture of air and gas in a predetermined ratio, of means for controlling the discharge of said primary mixture comprising a device adjustable to vary the volume of the primary mixture discharged and adapted to admit a secondary supply of air for intermixture with the primary mixture in a predetermined proportion varying in accordance with the variation in the volume of the primary mixture discharged.

17. An unloader for gaseous fuel supply systems comprising a discharge tube with a variable peripheral contour, a nozzle arranged to discharge into said tube, and means for controlling the discharge from said nozzle including a conical valve member located forwardly of the nozzle and having a seat in the tip of the nozzle, said valve member being adapted to intercept the flow of the gas discharged by the nozzle in a direction axially of the tube and to deflect it toward the inner peripheral wall of the tube.

18. An unloader for gaseous fuel supply systems comprising a discharge tube with a variable peripheral contour, a nozzle arranged to discharge into said tube, an air inlet opening communicating with the tube rearwardly of the end of said nozzle, a valve for controlling the flow of air through said opening, and means for controlling the discharge of gas from said nozzle comprising a member located forwardly of the nozzle and adapted to seat in the tip of the nozzle, said member being shaped to deflect the gas as it is discharged from the nozzle outwardly toward the inner peripheral wall of the tube.

19. An unloading device for gaseous fuel supply systems comprising, in combination, a casing having a discharge tube, a nozzle adapted to discharge a primary mixture into said tube, valve-controlled means for admitting a secondary supply of air drawn into said tube by the discharge of the primary mixture from said nozzle, means for controlling the volume of the primary mixture discharged, and means for varying the cross-sectional area of the passageway through said tube.

20. An unloading device of the character described, comprising, in combination, a casing having an air inlet opening and a discharge tube, a nozzle for discharging a gaseous fluid into said tube, a sleeve slidably but non-rotatably mounted on said nozzle, a second sleeve having a screw-threaded connection with the first sleeve, a valve member having a screw-threaded connection with the second sleeve and adapted to control said air inlet opening, and a valve member operable in the movement of said slidable sleeve to control said nozzle.

21. An unloading device of the character described, comprising, in combination, a casing having an air inlet opening and a discharge tube, a nozzle for discharging a gaseous fluid into said tube, a sleeve slidably but non-rotatably mounted on said nozzle, a second sleeve having a screw-threaded connection with the first sleeve, a valve member having a screw-threaded connection with the second sleeve and adapted to control said air inlet opening, a valve member operable in the movement of said slidable sleeve to control said nozzle, and a flexible tube operable with said valve means whereby to vary the cross sectional area of the passageway through said discharge tube.

22. An unloading device of the character described comprising, in combination, a casing having an air inlet opening and a discharge tube, a nozzle for discharging a gaseous fluid into said tube, a sleeve slidably but non-rotatably mounted on said nozzle, a second sleeve having a screw-threaded connection with the first sleeve, a valve member having a screw-threaded connection with the second sleeve and adapted to control said air inlet opening, a valve member operable in the movement of said slidable sleeve to control said nozzle, and means for actuating said outer or rotatable sleeve including a rotatable shaft extending exteriorly of the casing, and indicating means for facilitating the operation of said shaft to adjust the valve means.

23. An unloading device for gaseous fuel comprising, in combination, a casing having a Venturi discharge tube, means for discharging a variable amount of gaseous fuel into said discharge tube, and means including a movable wall for varying the cubic capacity of the Venturi tube in accordance with the variation in the volume of fuel discharged thereinto.

24. An unloading device for gaseous fuel comprising, in combination, a discharge tube having a neck in the shape of a Venturi tube, means for discharging a variable quantity of gaseous fuel into said tube, and a flexible sleeve entered in said tube to vary the cubic capacity thereof in accordance with the variation in the volume of gaseous fuel discharged thereinto.

25. An unloading device for gaseous fuel comprising, in combination, a discharge tube having a Venturi passageway with a flexible wall therein, valve means for controlling the discharge of a variable quantity of gaseous fuel into said tube, valve means associated with the last mentioned means for admitting a variable volume of air to said tube, means for adjusting one of said valve means, and means operatively associating said wall with one of said valve means for movement therewith.

26. The combination of a discharge tube providing a Venturi passageway, means including a valve for supplying under pressure a variable volume of fluid to said passageway, and means other than said valve operable to vary the cross-sectional area of the passageway.

27. The combination of a discharge tube providing a Venturi passageway, a nozzle arranged to discharge into said passageway, a valve for controlling said nozzle, an air inlet port communicating with said tube, a valve for controlling said port, a rotary operating device comprising a worm wheel, a worm for operating said wheel, and means providing screw-threaded connections between said wheel and each of said valves for actuating the latter.

28. An unloader device comprising a discharge tube, a nozzle arranged to discharge into said tube, an air inlet port communicating with said tube, a valve for controlling said nozzle, a valve for controlling said port, and a tubular rotary operating member, the inner and outer peripheries of which have screw-threaded engagement with the respective valve members adapted to move the valves at disproportionate speeds.

29. An unloading device comprising a discharge tube providing a Venturi passage, a nozzle arranged to discharge into said passage, means providing an air inlet port communicating with said tube, a valve for controlling said nozzle, a valve for controlling said port, means providing a screw-threaded connection between each of said valves and said member, and means associated with one of said valves operable to vary the size of said Venturi passage.

30. An unloading device comprising a discharge tube, means arranged to discharge a gaseous fluid into said tube, and means providing about the point of discharge of said nozzle a Venturi passageway, said means being operable to vary the contour of said passageway.

31. An unloading device comprising a discharge tube, an annular casing communicating with one end of said tube and providing an air inlet port, said tube being shaped at one end to form a Venturi passageway, a nozzle arranged to discharge into said passageway, a member mounted for rotation in said casing and held against axial movement, a disk having a screw-threaded connection with said member and providing a valve operable to vary the volume of air entering said tube, a tubular member also having a screw-threaded connection with said rotary member so as to be movable axially of the casing in the rotation of said rotary member, and a valve member connected with said tubular member and adapted to vary the discharge of gas from said nozzle.

32. An unloading device comprising a discharge tube, an annular casing communicating with one end of said tube and providing an air inlet port, said tube being shaped at one end to form a Venturi passageway, a nozzle arranged to discharge into said passageway, a member mounted for rotation in said casing and held against axial movement, a disk having a screw-threaded connection with said member and providing a valve operable to vary the volume of air entering said tube, a tubular member also having a screw-threaded connection with said rotary member so as to be movable axially of the casing in the rotation of said rotary member, and a valve member connected with said tubular member and adapted to vary the discharge of gas from said nozzle, said valve member being disposed forwardly of said nozzle directly in the line of axial discharge from the nozzle.

33. In a gaseous fuel supply system, the combination with means for supplying a primary mixture of air and gas, of a device into which said primary mixture-supplying means is adapted to discharge comprising a discharge tube, means for admitting a secondary supply of air to said discharge tube, means operable to control the admission of the secondary supply of air in accordance with the volume of the primary mixture discharged, and means operable manually to further control the secondary air supply.

34. In a gaseous fuel supply system, the combination of a discharge tube, means for discharging a primary mixture of air and gas into said tube, means for admitting a secondary supply of air to said tube, valve mechanism for controlling the admission in predetermined proportions of air and gas into said tube, and supplemental means operable independently of said valve means for additionally controlling the secondary air supply.

35. A gaseous fuel supply system comprising, in combination, a compressor having air and gas inlet ports, a supply main into which the compressor is adapted to discharge, an unloader operable to control the flow of the primary mixture from the supply main for combustion and having a discharge nozzle and means for mixing with the air and gas thus discharged a secondary supply of air, and a unitary valve means for controlling the admission of air and gas to the compressor and also the discharge of air and gas from the compressor whereby the volume of air and gas entering the compressor, passing therethrough into the supply main and traversing the supply main is of the same magnitude at any given time as the volume discharged from the unloader nozzle, said unloader also including a discharge tube having means providing a Venturi passage and operable to vary the effective size of said passage as the volume discharged by said nozzle increases and decreases whereby to maintain the pressure at the point of discharge substantially the same at all times.

36. An apparatus for mixing air and gas for combustion, comprising, in combination, a compressor, and an unloading device comprising a nozzle communicating with the outlet of the compressor, a tube into which said nozzle is arranged to discharge, a valve operable to control the rate of discharge from said nozzle, and means for operating the valve, disposed wholly exteriorly of the nozzle, said valve being seated in the outlet of the nozzle and extending beyond it directly in the path of the axial discharge from the nozzle.

37. An unloader for gaseous fuel supply systems comprising, in combination, a discharge tube, a nozzle for discharging a gas into said tube, means for admitting a supply of air to said tube induced by the discharge of the gas, and means including a conical valve member located externally in the outlet of the nozzle for diffusing the gas for intermixture with the incoming air, the last mentioned means being operable as a valve to control the discharge of the gas.

38. The combination in an apparatus of the character described, of a compressor and an unloading device comprising a discharge nozzle communicating with the compressor, a tube having an inlet port at its rear end and a mixing chamber in its forward portion into which said nozzle is arranged to discharge, valve means for controlling the discharge from the nozzle, valve means for controlling the inlet aperture of said tube, and a single manually operable micrometric means for actuating both of said valve means simultaneously but in varying degrees.

39. An apparatus for supplying gaseous fuel to a furnace chamber comprising, in combination, a compressor, a discharge nozzle communicating with the compressor, a tube into which said nozzle is arranged to discharge for connection with the furnace chamber, valve means for controlling the discharge of one element of the mixture from said nozzle, valve-controlled means for supplying another element of the mixture to said tube, and means for varying the volumetric capacity of the tube at the point of discharge from said nozzle whereby to maintain a velocity of the mixture passing through the tube toward the furnace such as to exceed at all times the retreat velocity of flame propagation.

40. An apparatus for suplying gaseous fuel to a furnace chamber comprising, in combination, a compressor, a discharge nozzle communicating with the compressor, a tube into which said nozzle is arranged to discharge, valve means for controlling the discharge of one element of the mixture from said nozzle, and means coordinated with said valve means for varying the volumetric capacity of the tube so as to maintain therein a velocity sufficient to prevent the retreat of the flame notwithstanding the variation in volume of the mixture being consumed.

41. An apparatus of the character described comprising, in combination, a compressor having a casing provided with an inlet and an outlet, a service main connected with the compressor outlet, means controlled by the pressure at said outlet for maintaining a predetermined pressure in the service main, an unloader device communicating with the service main and having means for varying the flow of the fluid therefrom, and means operable to maintain a predetermined velocity for the fluid flowing in varying volumes.

42. A device for supplying a gaseous fuel for combustion comprising a nozzle communicating with a source of supply of an element under pressure, a tube into which said nozzle is arranged to discharge and communicating with a source of supply of another element, a pair of valve members respectively controlling the flow of the two elements, and means for actuating both of said valve members including a rotatable actuating member.

43. A device for supplying a gaseous fuel for combustion comprising a nozzle communicating with a source of supply of an element under pressure, a tube into which said nozzle is arranged to discharge and communicating with a source of supply of another element, means controlling the flow of one of the elements including an actuating member, and means for maintaining the velocity of the mixture of said elements discharged in varying volumes, said means including a flexible wall encircling the end of said nozzle and operable in the movement of said member to vary the volumetric capacity of the passageway into the chamber.

44. An apparatus of the character described comprising a compressor, a discharge nozzle communicating with the compressor, valve means for maintaining the pressure at said nozzle substantialy constant, and a mixing chamber into which said nozzle discharges, said chamber having an inlet and an outlet and being of variable diameter between its ends so as to control the pressure of the mixture discharged in varying volumes.

45. In an apparatus of the character described, the combination with means for discharging a mixture of air and gas for combustion, of a compressor having an inlet and an outlet, means for limiting the volume entering the compressor to that discharged thereby, and means for maintaining a predetermined velocity of the mixture as it is discharged in varying volumes.

46. In an apparatus of the character described, the combination of means for controlling the flow of a gaseous mixture including a discharge passage having an inner periphery in the form of a Venturi tube, and an adjustable wall in said tube operable to maintain a velocity approximately equal to the rate of flame propagation as the volume of the mixture consumed rises and falls.

47. The method of fluid supply which consists in supplying the fluid under pressure and in varying volumes to a discharge passage, and maintaining the velocity of the discharge substantially constant by constricting the passage between its ends to a greater or less degree as the volume supplied varies.

48. The method of supplying air and gas for combustion which consists in subjecting a primary mixture of air and gas to pressure for delivery to the service main, admitting a secondary supply of air to the primary mixture as it is discharged at the burner outlet, varying the volume of the secondary air admitted in accordance with the volume of the primary mixture discharged, and varying the volumetric capacity of the discharge passage as the volume of the primary mixture varies from time to time whereby to maintain at all times the pressure in the discharge passage substantially constant.

49. The method of control for gaseous fuel supply systems which consists in limiting the volume of the mixture of air and gas delivered to the service main to that consumed at any given time, and varying the volumetric capacity of the passage into which the mixture is discharged at the burner outlet from the service main as the volume of the mixture is varied from time to time, whereby to maintain the mixture under substantially constant pressure at all times.

In testimony whereof, I have hereunto set my hand.

THERON L. HILES.